United States Patent
Ferreira Yanez et al.

(10) Patent No.: US 9,937,870 B1
(45) Date of Patent: Apr. 10, 2018

(54) MOTOR VEHICLE WITH INTEGRATED BIKE RACK

(71) Applicant: FORD GLOBAL TECHNOLOGIES, LLC, Dearborn, MI (US)

(72) Inventors: Francisco Javier Ferreira Yanez, Atizapna de Zaragoza (MX); Jose Alfredo Peregrina Loera, México City (MX); Carlos Alberto Tavera Guerrero, Mexico City (MX); Leonardo Alonso Huitron Rodriguez, Naucalpan de Juarez (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/287,968

(22) Filed: Oct. 7, 2016

(51) Int. Cl.
*B60R 9/10* (2006.01)
*B60R 9/06* (2006.01)

(52) U.S. Cl.
CPC . *B60R 9/10* (2013.01); *B60R 9/06* (2013.01)

(58) Field of Classification Search
CPC .. B60R 9/10; B60R 9/06; B60R 5/041; B60R 5/006
See application file for complete search history.

(56) References Cited

U.S. PATENT DOCUMENTS

| | | | | |
|---|---|---|---|---|
| 3,338,620 A | * | 8/1967 | Cauvin | B60N 3/001 108/44 |
| 4,029,245 A | * | 6/1977 | Berlin | B60R 5/041 211/60.1 |
| 4,301,956 A | | 11/1981 | Hoerner | |
| 4,461,413 A | * | 7/1984 | Hoerner | B60R 9/10 224/311 |
| 4,616,972 A | * | 10/1986 | McFarland | A61G 3/0209 224/496 |
| 6,547,115 B1 | * | 4/2003 | Kato | B60R 9/06 224/311 |
| 6,752,302 B2 | | 6/2004 | Anton | |
| 6,889,880 B2 | * | 5/2005 | Albaisa | B60R 9/06 224/489 |
| 7,121,597 B2 | | 10/2006 | Chuang | |
| 8,302,829 B2 | * | 11/2012 | Lee | B60R 9/06 224/488 |
| 8,418,902 B2 | | 4/2013 | Cha et al. | |
| 9,290,132 B2 | | 3/2016 | Anton | |
| 2002/0023938 A1 | * | 2/2002 | Kmita | B60P 3/40 224/403 |
| 2010/0001029 A1 | | 1/2010 | Tai | |
| 2014/0299642 A1 | | 10/2014 | Schatz et al. | |
| 2015/0321620 A1 | * | 11/2015 | Lungershausen | B60R 9/06 224/497 |

* cited by examiner

*Primary Examiner* — Corey Skurdal
(74) *Attorney, Agent, or Firm* — Jason Rogers; King & Schickli, PLLC

(57) ABSTRACT

A motor vehicle is provided incorporating an integrated bike rack. That bike rack includes a support arm, a first sill segment that is received in a slot and aligned with a closure sill of the motor vehicle when the bike rack is in a stowed position and a second sill segment that is received in a slot and aligned with the closure sill when the bike rack is in a deployed position. A related method is also disclosed.

15 Claims, 6 Drawing Sheets

MOTOR VEHICLE WITH INTEGRATED BIKE RACK

TECHNICAL FIELD

This document relates generally to the motor vehicle equipment field and, more particularly, to a bike rack that may be integrated into the design of a motor vehicle as well as to a motor vehicle incorporating an integrated bike rack.

BACKGROUND

The concept of providing a bike rack that may be installed on a motor vehicle to carry one or more bicycles is well known in the art. Unfortunately, prior art bike racks are generally after-market devices that are inconvenient to use. When one wishes to carry a bicycle, the bike rack must be installed on the motor vehicle. Bike rack installation is typically time consuming and at times frustrating. It is also very easy to mar the finished surfaces of the motor vehicle during bike rack installation.

Such bike racks are also somewhat cumbersome and, when installed, may hinder or interfere with proper operation of a trunk lid, tailgate or other closure of the motor vehicle. Accordingly, it is often desirable to remove the bike rack from the motor vehicle when not in use. Removal can be another time consuming, and frustrating task and provides another opportunity to inadvertently scratch, mar or otherwise damage the finished surfaces of the motor vehicle. Further, after the bike rack has been removed, it must be stored and is often in the way in a garage or other storage area.

This document relates to a new and improved bike rack that is integrated into the design of the motor vehicle as well as to a motor vehicle incorporating an integrated bike rack. Thus, the integrated bike rack is stowed on the motor vehicle in an aesthetically pleasing manner and is available at all times to be conveniently deployed and used as needed by the motor vehicle operator.

SUMMARY

In accordance with the purposes and benefits described herein, a bike rack is provided for a motor vehicle. That bike rack comprises a support arm, a first sill segment on the support arm that is aligned with a closure sill of the motor vehicle when the bike rack is in a stowed position and a second sill segment on the support arm that is aligned with the closure sill when the bike rack is in a deployed position. The bike rack may further include a pivot connecting the support arm to the motor vehicle.

The support arm may further include a U-shaped bike carrier.

In accordance with an additional aspect, a motor vehicle is provided comprising a closure sill including a slot and a bike rack. The bike rack includes a first sill segment received in the slot when the bike rack is in a stowed position and a second sill segment received in the slot when the bike rack is in the deployed position.

The bike rack may include a support arm. Further, a pivot may be provided connecting the support arm to a bike rack support of the motor vehicle.

The first sill segment may be carried on the base. Similarly, the second sill segment may be carried on the base. Further, the first sill segment and the second sill segment may be opposed.

In addition, the motor vehicle may include a floor adjacent the closure sill. That floor may include a recess receiving and holding the support arm when the bike rack is in the stowed position. Further, the recess may be in communication with the slot in the closure sill.

Still further, the support arm may include a U-shaped bike carrier. Further, the motor vehicle may include a closure that properly seats and seals against (a) the closure sill and the first sill segment when the bike rack is in the stowed position and (b) the closure sill and the second sill segment when the bike rack is in the deployed position.

In accordance with yet another aspect, a method is provided of integrating a bike rack with a motor vehicle. That method comprises the steps of: (a) providing a bike rack with a first sill segment and second sill segment, (b) incorporating a slot into a closure sill of the motor vehicle, (c) aligning the first sill segment in the slot when the bike rack is in the stowed position and (d) aligning the second sill segment in the slot when the bike rack is in the deployed position.

Further, the method may include the step of closing and sealing a closure against the closure sill and the first sill segment when the bike rack is in the stowed position. Further, the method may include the step of closing and sealing the closure against the closure sill and the second sill segment when the bike rack is in the deployed position.

Still further, the method may include the step of pivoting the bike rack between the stowed position and the deployed position. In addition, the method may include the step of holding a support arm of the bike rack in a recess in a floor of the motor vehicle when the bike rack is in the stowed position.

In the following description, there are shown and described several preferred embodiments of the bike rack and the motor vehicle incorporating the integrated bike rack. As it should be realized, the bike rack and the motor vehicle are capable of other, different embodiments and their several details are capable of modification in various, obvious aspects all without departing from the bike rack and motor vehicle as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the bike rack and the motor vehicle and together with the description serve to explain certain principles thereof. In the drawing figures.

Reference will now be made in detail to the present preferred embodiments of the bike rack and motor vehicle, examples of which are illustrated in the accompanying drawing figures.

DETAILED DESCRIPTION

Figure 1:
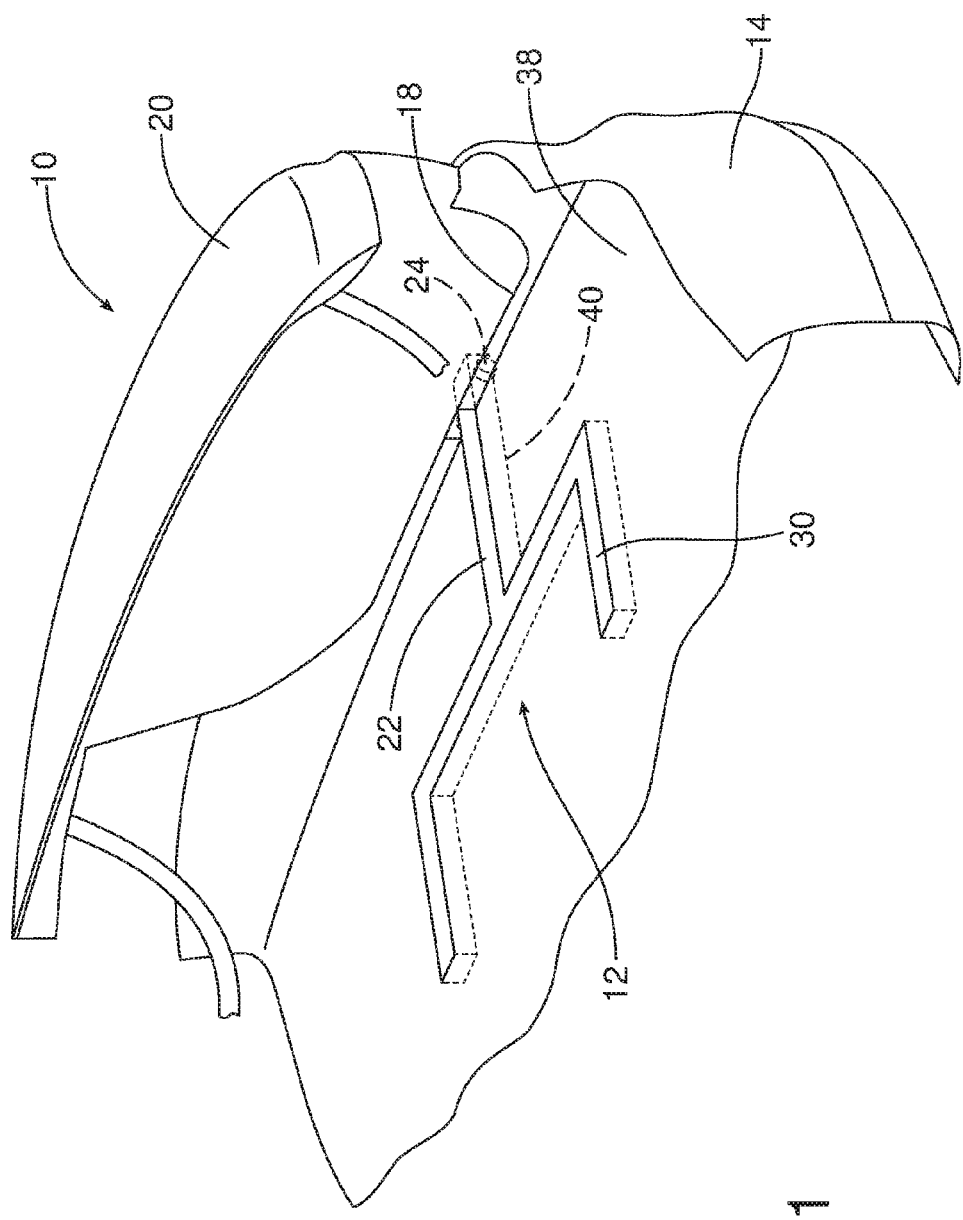
FIG. 1 is a perspective view illustrating the motor vehicle with the integrated bike rack in the stowed position.
Figure 2:
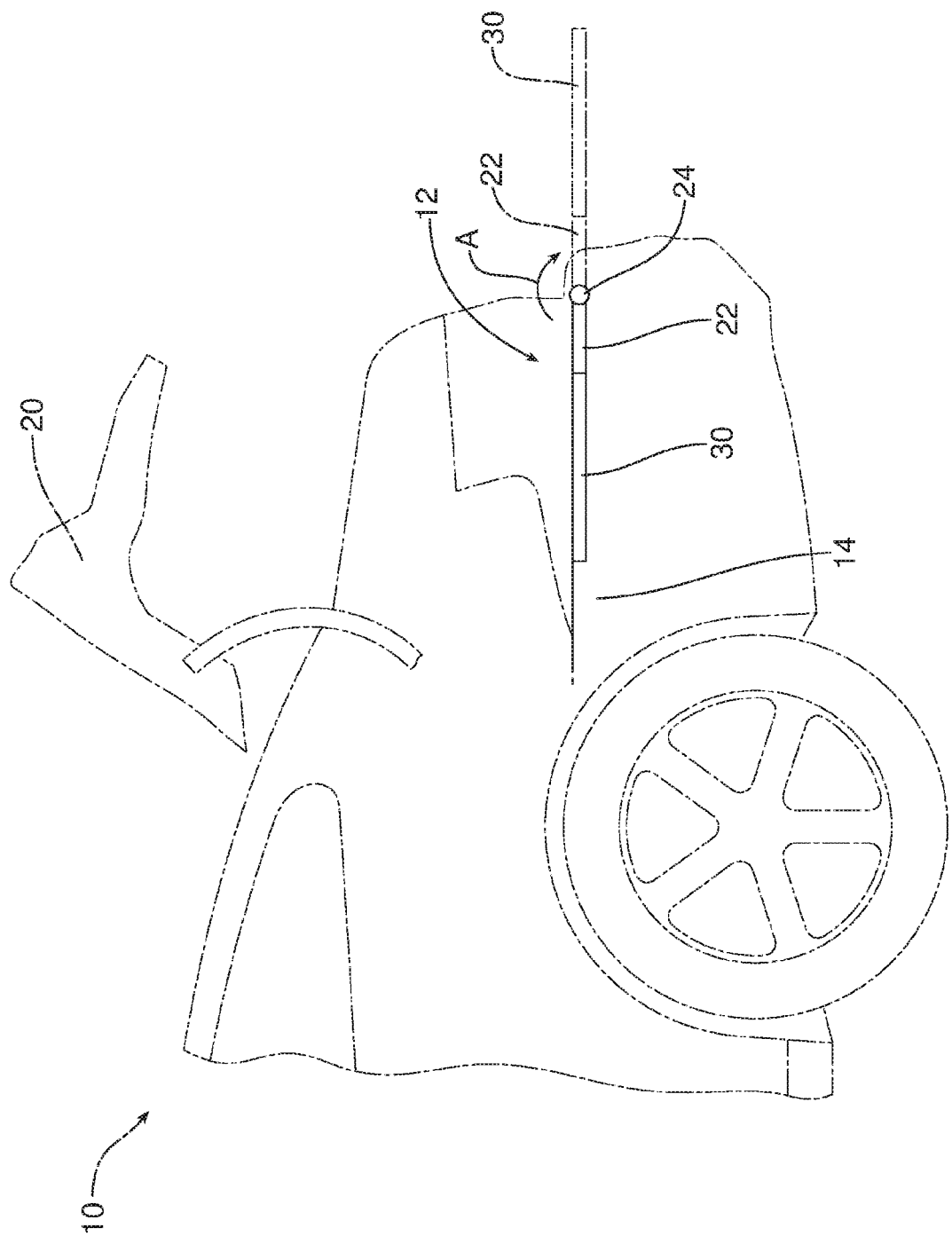
FIG. 2 is a schematic side elevational view illustrating how the bike rack is pivoted between the stowed position wherein the support arm of the bike rack is received in a recess in the floor of the motor vehicle and a deployed position wherein the support arm of the bike rack projects rearward from the rear fascia of the motor vehicle and is in position to hold a bicycle.
Figure 3:
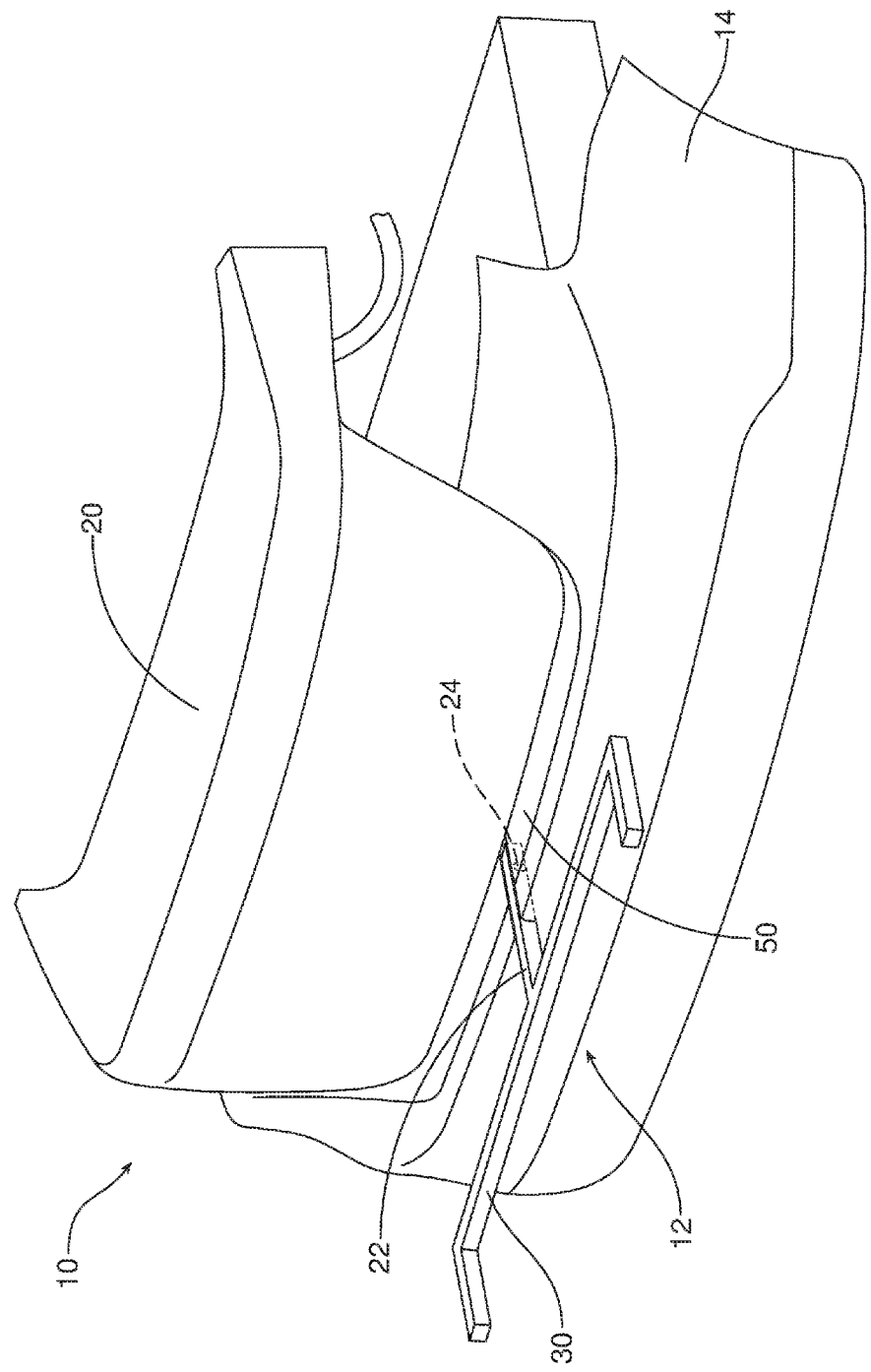
FIG. 3 is an exterior perspective view of the motor vehicle illustrating the bike rack in the deployed position ready to receive and hold a bicycle.
Figure 3A:
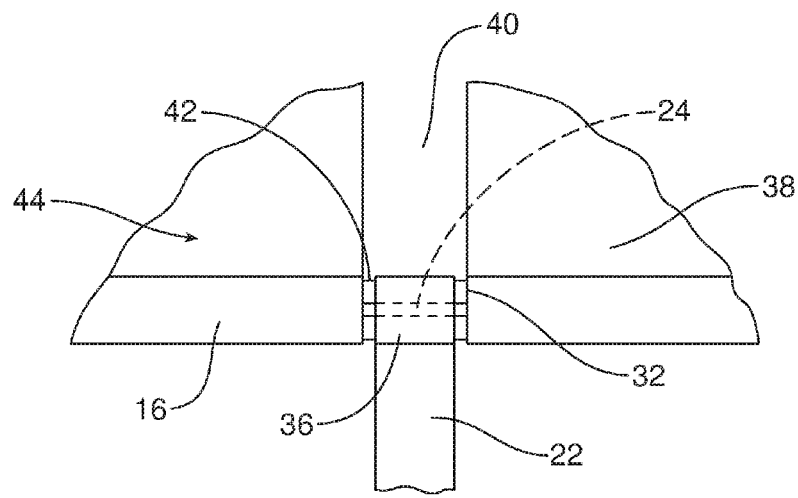
FIG. 3a is a detailed schematic top plan view of the closure sill showing the bike rack in the deployed position.

Reference is now made to FIGS. 1-3 illustrating a motor vehicle 10 incorporating a fully integrated bike rack 12. As illustrated, the motor vehicle 10 includes a body 14 having a closure sill 16 at the bottom of a closure opening 18 which is closed by the closure 20.

In the illustrated embodiment, the closure 20 comprises a trunk lid. It should be appreciated, however, that the closure 20 may comprise a hatchback panel, lift gate, tailgate or other type of motor vehicle closure.

The bike rack 12 includes a support arm 22 that is connected by means of a pivot 24 to a bike rack support 26 such as a part of the body or frame of the motor vehicle 10. The support arm 22 may include a U-shaped bike carrier 30 adapted for engaging or holding one or more bicycles (not shown). When deployed, tethers such as bungee cords, ropes or straps (not shown) may be utilized to secure a bicycle to the U-shaped bike carrier 30 in a manner known in the art.

As illustrated in the drawing figures, the closure sill 16 includes a slot 32. The support arm 22 includes a first sill segment 34 and a second sill segment 36. The support arm 22 is oriented so that the first sill segment 34 is aligned with the closure sill 16 and received in and completely fills the slot 32 when the bike rack is in the stowed position illustrated in FIGS. 1-1b. In contrast, the second sill segment 36 is aligned with the closure sill 16 and received in and fills the slot 32 when the bike rack 12 is in the deployed position illustrated in FIGS. 3-3b.

In the embodiment illustrated in FIG. 1, the motor vehicle 10 includes a floor 38 adjacent the closure sill 16. A recess 40 of complimentary shape to the support arm 22, including the U-shaped bike carrier 30, is provided in the floor 38. That recess 40 has an open end 42 that is in communication with the slot 32 in the closure sill 16. Thus, when the bike rack 12 is in the stowed position, the support arm 22 is received in the recess 40 with the top of the support arm substantially flush with the surface of the floor 38. Accordingly, when the bike rack 12 is in the stowed position, the bike rack is stored in a manner that allows full use of the storage area 44 of the motor vehicle 10 while being conveniently located for easy access.

Figure 1A:
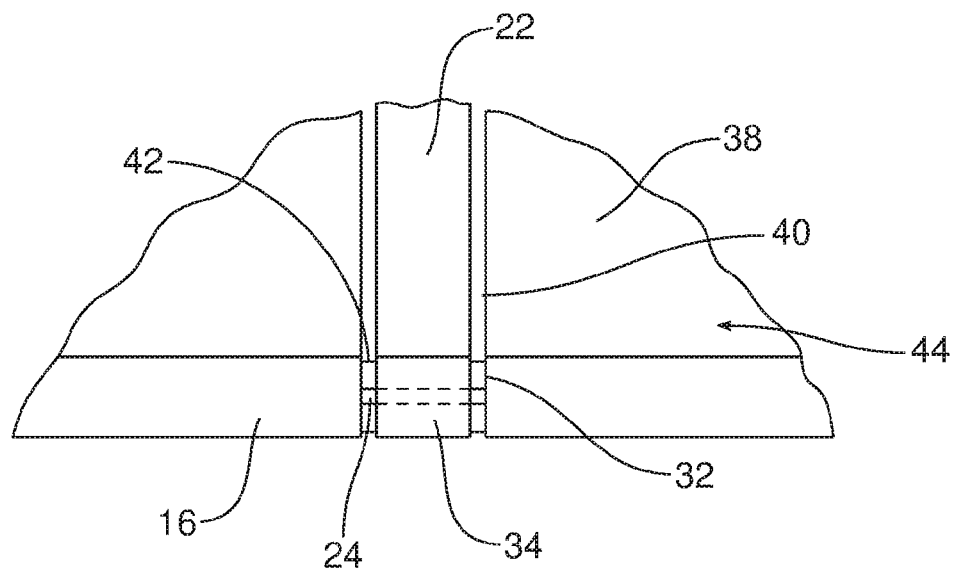
FIG. 1a is a detailed schematic top plan view of the closure sill showing the bike rack in the stowed position.
Figure 1B:
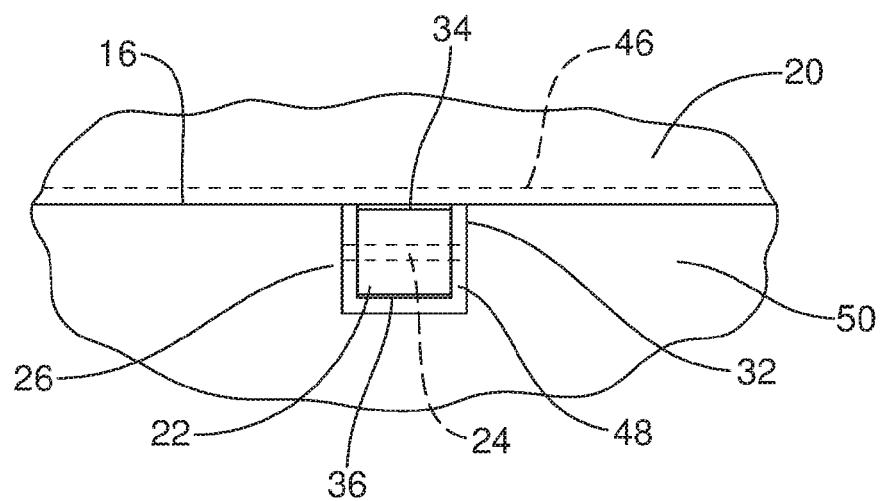
FIG. 1b is a detailed schematic exterior elevational view of the rear of the motor vehicle showing the bike rack in the stowed position.
Figure 4:
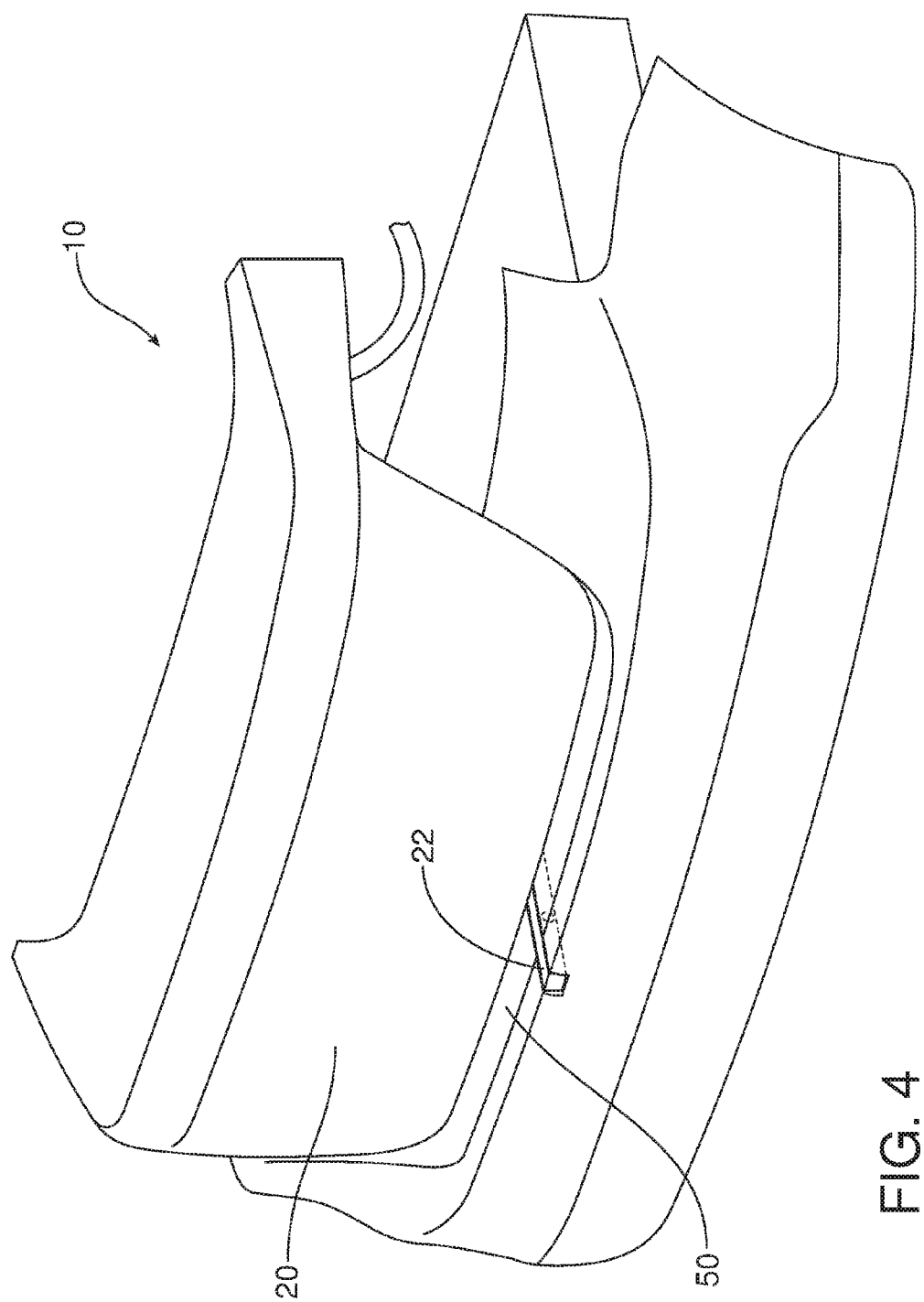
FIG. 4 is an exterior perspective view illustrating the bike rack in the stowed position.

As should also be appreciated from viewing FIGS. 1-1b and 4, the closure 20 properly seats and seals against the closure sill 16 and the first sill segment 34 when the bike rack 12 is in the stowed position. Note closure seal 46 carried on the closure 20. A U-shaped seal 48 may be carried on the motor vehicle 10 to seal around the support arm 22 at the sides and bottom of the slot 32.

As illustrated in FIG. 2, when one wishes to deploy the bike rack 12, one simply pivots (note action arrow A) the bike rack 12 about the pivot 24 until the support arm 22, including the U-shaped bike carrier 30 projects rearwardly from the rear fascia 50 of the motor vehicle 10. In this position, the support arm 22/U-shaped bike carrier 30 is ready to receive and hold one or more bicycles.

Figure 3B:
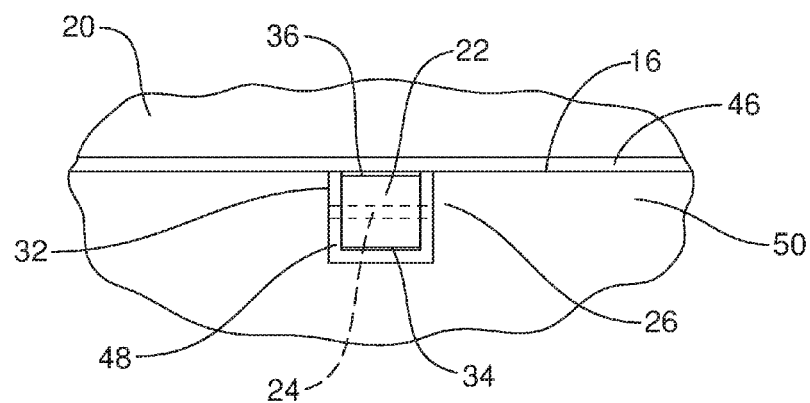
FIG. 3b is a detailed schematic interior elevational view showing the bike rack in the deployed position.

As should be further appreciated from viewing FIGS. 3-3b, the closure 20 will properly seat and the closure seal 46 will properly seal against the closure sill 16 and the second sill segment 36 in the slot 32 thereby sealing the storage area 44 from inclement weather. Here, again, it should be noted that the U-shaped seal 48 will provide sealing between the support arm 22 and the rear fascia 50 forming the sidewalls and bottom of the slot 32.

Consistent with the above description, a method is provided of integrating a bike rack 12 with a motor vehicle 10. That method comprises the steps of: (a) providing the bike rack 12 with a first sill segment 34 and a second sill segment 36, (b) incorporating a slot 32 into the closure sill 16 of the motor vehicle 10, (c) aligning the first sill segment in the slot when the bike rack is in a stowed position as illustrated in FIGS. 1-1b and (d) aligning the second sill segment in the slot when the bike rack is in the deployed position as illustrated in FIGS. 3-3b.

The method may also include the step of closing and sealing the closure 20 against the closure sill 16 and the first sill segment 34 when the bike rack 12 is in the stowed position as illustrated in FIGS. 1-1b. In addition, the method includes the step of closing and sealing the closure 20 against the closure sill 16 and the second sill segment 36 when the bike rack is in the deployed position illustrated in FIGS. 3-3b.

In addition, the method includes the step of pivoting the bike rack 12 between the stowed position and the deployed position. As illustrated in FIG. 2, the bike rack 12 is pivoted about the pivot 24 that connects the support arm 22 to the bike rack support 26 of the motor vehicle 10. Note action arrow A.

In addition, the method includes the step of holding the support arm 22 of the bike rack 12 in a recess 40 in the floor 38 of the motor vehicle when the bike rack is in the stowed position (see FIGS. 1, 1a and 2). Thus, it should be appreciated that the motor vehicle includes a dedicated storage space (i.e. the recess 40 in the floor 38) for the bike rack when it is not in use. As such, the normal storage space of the motor vehicle above the floor 38 is maintained unencumbered for use to store other items.

The new and improved integrated bike rack 12 and the motor vehicle 10 equipped with the integrated bike rack provide a number of benefits and advantages. The bike rack 12 is very easy to use. The bike rack 12 is conveniently stowed in a recess 40 in the floor 38 of the motor vehicle where it is out of the way, does not hinder use of the storage area yet is ready for use at all times. One need only open the closure 20, pivot the bike rack 12 into the deployed position as illustrated by action arrow A in FIG. 2 and then attach a bicycle to the U-shaped bike carrier 30.

By incorporating a closure sill 16 with a slot 32 through which the support arm 22 of the bike rack 12 may be extended and providing the support arm with two sill segments 34, 36 to fill the slot and complete the sill when the bike rack 12 is in either the stowed or deployed positions, the closure 20 will seal the storage compartment/closure opening when the bike rack is in either position. Thus, the storage area of the motor vehicle 10 may be isolated from ambient weather conditions at all times.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A bike rack for a motor vehicle including a storage area closed by a closure, comprising:
   a support arm;
   a first sill segment on said support arm and aligned with a closure sill of said motor vehicle when said bike rack is in a stowed position such that the closure seals against the closure sill and the first sill segment when the bike rack is in the stowed position;
   a second sill segment on said support arm and aligned with said closure sill when said bike rack is in a deployed position such that the closure seals against the closure sill and the second sill segment when the bike rack is in the deployed position thereby sealing the storage area; and
   a floor adjacent said closure sill, said floor including a recess receiving and holding said support arm when said bike rack is in said stowed position.

2. The bike rack of claim 1, further including a pivot connecting said support arm to said motor vehicle.

3. The bike rack of claim 2, wherein said support arm further includes a U-shaped bike carrier.

4. A motor vehicle, comprising:
   a closure sill including a slot;
   a bike rack having a support arm, a first sill segment, received in said slot when said bike rack is in a stowed position, and a second sill segment received in said slot when said bike rack is in a deployed position; and
   a floor adjacent said closure sill, said floor including a recess receiving and holding said support arm of said bike rack when said bike rack is in said stowed position.

5. The motor vehicle of claim 4, wherein said bike rack includes a base, said support arm projecting from said base.

6. The motor vehicle of claim 5, further including a pivot connecting said support arm to a bike rack support.

7. The motor vehicle of claim 6, wherein said first sill segment is on said support arm.

8. The motor vehicle of claim 7, wherein said second sill segment is on said support arm opposite said first sill segment.

9. The motor vehicle of claim 8, wherein said recess is in communication with said slot in said closure sill.

10. The motor vehicle of claim 9, wherein said support arm includes a U-shaped bike carrier.

11. The motor vehicle of claim 10, further including a closure that properly seats and seals against (a) said closure sill and said first sill segment when said bike rack is in said stowed position and (b) said closure sill and said second sill segment when said bike rack is in said deployed position.

12. A method of integrating a bike with a motor vehicle, comprising:
    providing a bike rack with a first sill segment and a second sill segment;
    incorporating a slot into a closure sill of said motor vehicle;
    aligning said first sill segment in said slot when said bike rack is in a stowed position;
    aligning said second sill segment in said slot when said bike rack is in a deployed position; and
    holding a support arm of said bike rack in a recess in a floor of said motor vehicle when said bike rack is in said stowed position.

13. The method of claim 12, including closing and sealing a closure against said closure sill and said first sill segment when said bike rack is in a stowed position.

14. The method of claim 13, including closing and sealing said closure against said closure sill and said second sill segment when said bike rack is in said deployed position.

15. The method of claim 14, including pivoting said bike rack between said stowed position and said deployed position.

* * * * *